United States Patent [19]

Gerry

[11] 4,337,732

[45] Jul. 6, 1982

[54] FUEL AND WATER CONDITIONER AND METHOD THEREFOR

[76] Inventor: Martin E. Gerry, 13452 Winthrope St., Santa Ana, Calif. 92705

[21] Appl. No.: 153,699

[22] Filed: May 27, 1980

[51] Int. Cl.³ ............................................. F02D 19/00
[52] U.S. Cl. ................................. 123/25 B; 123/25 P; 123/548; 261/18 A
[58] Field of Search ................. 123/25 B, 25 P, 25 L, 123/25 R, 548, 543; 261/18 A, DIG. 66, 36 A

[56] References Cited

U.S. PATENT DOCUMENTS

| | | | |
|---|---|---|---|
| 2,580,013 | 12/1951 | Gazda | 123/25 A |
| 2,717,148 | 9/1955 | Hall | 123/25 A |
| 2,843,216 | 7/1958 | Powell | 123/25 A |
| 3,044,453 | 7/1962 | Hoffmann | 123/25 B |
| 4,005,683 | 2/1977 | Whitt | 123/25 B |
| 4,112,889 | 9/1978 | Harpman | 123/25 B |
| 4,114,566 | 9/1978 | Harpman et al. | 123/25 B |
| 4,145,998 | 3/1979 | Mahoney et al. | 123/25 B |
| 4,197,819 | 4/1980 | Mahoney et al. | 123/25 B |

FOREIGN PATENT DOCUMENTS 2380430 10/1978 France ......................... 123/25 P Primary Examiner—Charles J. Myhre
Assistant Examiner—E. Rollins Cross

[57] ABSTRACT

A fuel and water conditioner (10) integrated as a single unit is used with an engine that develops motive power. Such conditioner includes a first compartment (24) that vaporizes the fuel, and a second compartment (26) that vaporizes the water. An air intake structure (30) enables an air stream (32) to flow within the conditioner and through air filter (28) into the intake manifold (60) of the engine. The vaporized fuel and water is carried by and combines with the air stream into such intake manifold. Various heating devices (50, 250) are thermally coupled to the conditioner to heat the fuel and water in such conditioner and assist in further vaporizing such fuel and water.

15 Claims, 5 Drawing Figures

FUEL AND WATER CONDITIONER AND METHOD THEREFOR

DESCRIPTION

1. Technical Field

This invention is in the field of carburetors or fuel injectors. Such invention is also in the field of such carburetors or fuel injectors wherein water injection systems are used therewith.

This invention utilizes a method and a structure for effecting conditioning of the fuel and water and mixing the conditioned fuel and water vapors with an air stream.

2. Background Art

Carburetors which mix fuel and air in predetermined ratios have been used for many years. Such carburetors are mechanically complex and expensive and do not adequately convert liquid fuel to a fine enough vapor. Such carburetors do not possess the ability to mix vaporized fuel with water and consquently lose an energy source consisting of the hydrogen molecules comprising the water.

Fuel injection systems have been devised to also mix predetermined quantities of fuel with air and to substitute for the carburetor. Such fuel injection systems are even more complex and more expensive than carburetors. Additionally, the fuel injection systems do not provide the ability to integrate water vapor injection methods with the injected fuel.

Neither the carburetor nor the fuel injector has the ability to process fuel to its vapor state and to mix water vapor therewith and with air from an atmospheric air stream in a single simple device. Neither the carburetor nor the fuel injector provides means for preheating fuel and water to a level below their boiling points nor to further vaporize such fuel and water mixture to extremely fine particles for injection into the engine in the presence of an air stream.

DISCLOSURE OF INVENTION

It is therefore an objective of this invention to provide a fuel conditioner which disperses and atomizes liquid fuel into very fine particles.

It is another objective of this invention to mix the very fine fuel particles with equally fine water particles within the conditioner, and thereby capture an additional high energy source of hydrogen molecules comprising the water particles.

It is still another objective of this invention to replace the conventional carburetor or the conventional fuel injector with an inexpensive and highly efficient fuel and water conditioner.

It is yet another objective of this invention to provide such fuel and water conditioner which will enable air to be mixed with the fuel and water vapors therein for feeding the engine.

It is a further objective of this invention to provide a free source of heat generated by the engine for further vaporizing the mixture of fuel and water prior to such mixture being fed to the engine in the presence of an air stream.

Accordingly, a system is provided that conditions energy components initially in their liquid states. Energy components of liquid fuel and water are fed into independent compartments of the conditioner wherein the liquid fuel and water are each diffused and atomized, and the mixture of atomized fuel and water is mixed with air to be fed to the intake manifold of the engine.

A heat source, generally obtained from the engine system itself, such as from the exhaust manifold or the engine coolant circulatory subsystem, may be used to further vaporize the already atomized mixture of fuel and water. Such is accomplished by heating the fuel and water fluids, generally by heat conduction, from a suitable chamber connected to the exhaust manifold or to the coolant subsystem, to pass the heat in the exhaust manifold or the coolant subsystem through the walls or heat conductive structure of the fuel and water conditioner.

The diffusion and atomization of the fuel and water from their liquid states occurs due to the pressure differential between the base of the conditioner at its lowest elevation and the cover of such conditioner at its highest elevation level in the presence of an air stream flow into the conditioner.

BEST MODE FOR CARRYING OUT THE INVENTION

Figure 1:
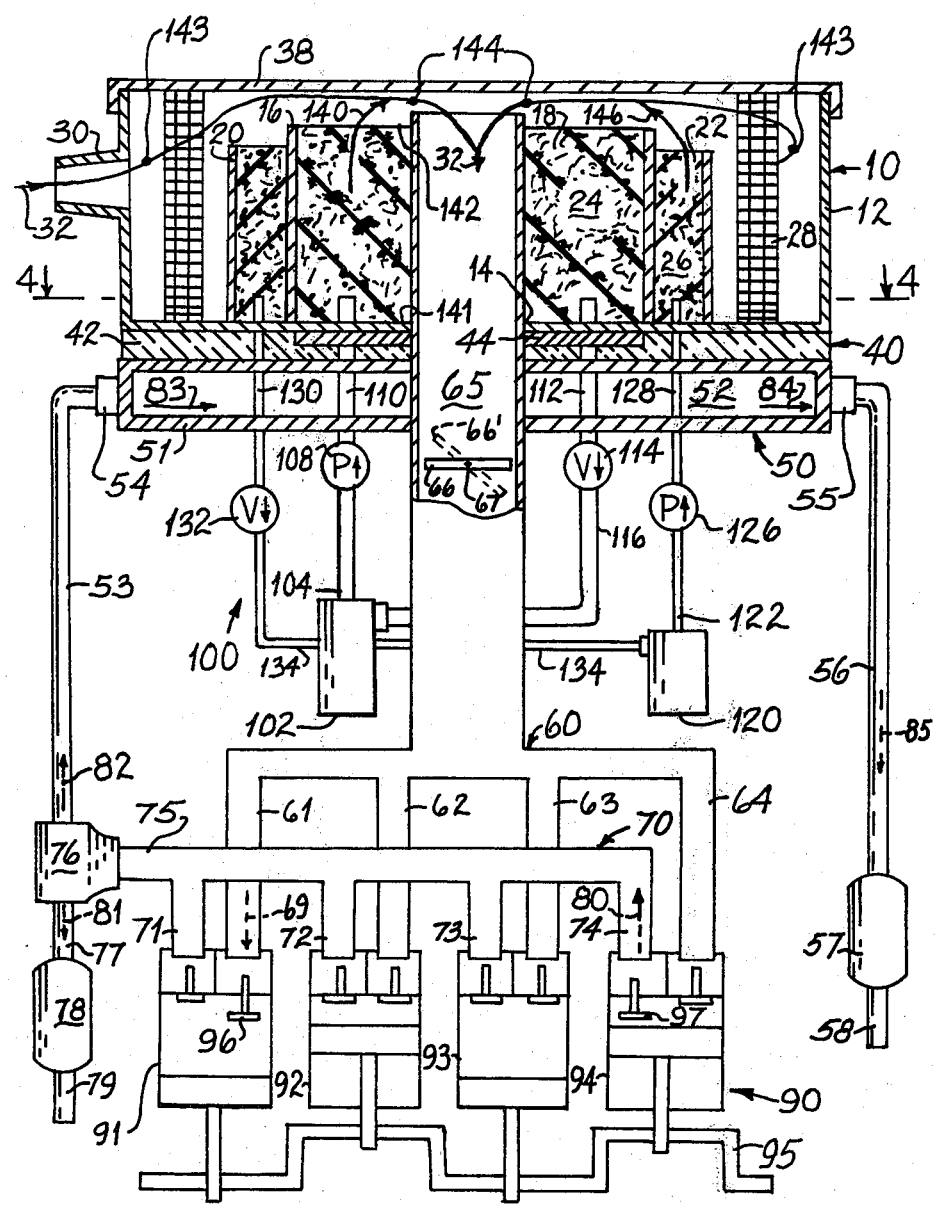
FIG. 1 is a cross-section view of a fuel and water conditioner affixed to the intake manifold of an engine, heat insulation means in cooperation with the conditioner, a heating chamber fed by exhaust fluids of the engine, an elevation view of a fuel and water supply feeding such fuel conditioner, and a partial schematic view of the engine's exhaust and intake manifolds connected to the cylinders of the engine, in accordance with this invention.
Figure 3:
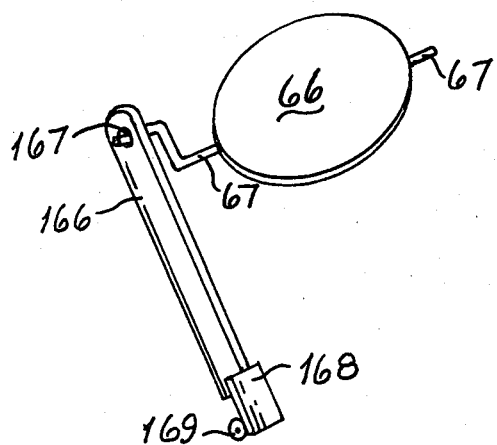
FIG. 3 is a simplified version of an engine throttle mechanism in perspective view, as used to actuate the throttle member installed in the throat of the engine's intake manifold as illustrated in FIG. 1.
Figure 4:
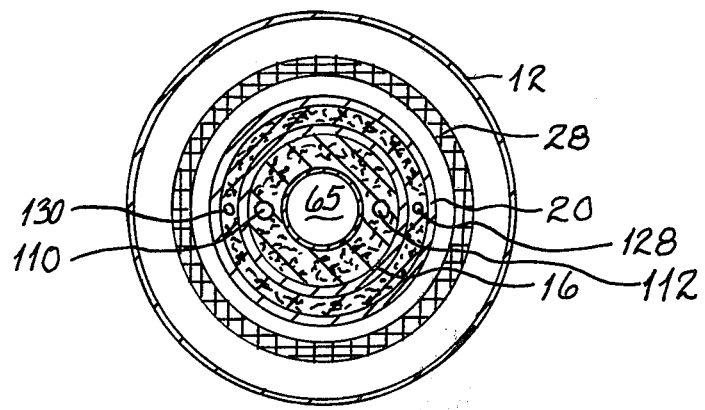
FIG. 4 is a cross-section view taken at plane 4—4 of FIG. 1 to show another view of the fuel and water conditioner.

Referring to FIGS. 1, 3 and 4, a fuel and water conditioner is shown at 10. Conditioner 10 includes housing 12 which is generally of cylindrical shape though not restricted in any way to such shape. Such housing may be made of non-corrosive metal such as stainless steel, galvanized steel or copper, or may be made of a thermoset plastic material. Housing 12 has a central aperture at 14 for fitting conditioner 10 to the throat portion 65 of intake manifold 60, throat 65 extending through aperture 14.

Conditioner 10 may be constructed so as to provide a plurality of compartments. Partition or wall 16 forms a first compartment 24 circumjacent throat 65 of intake manifold 60 of the engine. Another partition or wall 20, circumjacent compartment 24, forms a second compartment 26. Partitions 16 and 20 may be made of non-corrosive metal such as stainless steel, galvanized steel or copper, or of a thermoset plastic material.

Walls 16 and 20 are an integral part of housing 12, and if housing 12 is metallic, then walls 16 and 20 may be welded to the bottom of such housing to avoid fluids in compartments 24 and 26 from mixing when such fluids are residual within such compartments in their liquid states. Compartment 24 is filled with a fuel diffusing or dispersing substance such as coarse steel wool 18. Compartment 26 is filled with a water diffusing or dispersing substance such as steel wool as at 22.

Housing 12 contains a standard air filter 28, commonly used for automobile carburetor air-filtering. Air filter 28 in this configuration is circumjacent compartment 26. Housing 12 has an air intake port 30 for admitting an atmospheric air stream as at 32. Air stream 32 circulates around the outer periphery of air filter 28 and passes through filter 28 to be pulled into throat 65 of the engine's intake manifold 60. Air stream 32 also passes directly through filter 28 in proximity of port 30 to be pulled into throat 65 by intake suction action of one of the engine cylinders. Of course, it is understood that air stream 32 will pass though filter 28 along the entire filter 28 periphery although only two such passage points have been graphically illustrated. Housing 12 is fitted with a reasonably air-tight cover 38 of similar material to that used for fabricating housing 12.

Apertures are provided in the bottom or base of housing 12 for admitting fuel and water conduits and return overflow conduits. These conduits have individual seals, not shown, for preventing liquid leakage from within compartments 24 and 26. Such seals may be of the O-ring or equivalent type. If preferred, such conduits can be made an integral part of the housing by welding such conduits to housing 12 at their entry points to compartments 24 and 26. If housing 12 is of a thermoset plastic material, impervious to being dissolved by fuel such as gasoline or diesel fuel, then conduits 110, 112, 128 and 130 can be made an integral part of the housing by being molded of the same plastic material to that of housing 12.

Considering the effect upon the fuel within compartment 24, the liquid fuel at the base of compartment 24 is dispersed and atomized into small particles flowing through diffusion material 18 in compartment 24, as represented by flow direction arrow 140. An upward pressure is created in compartment 24 by virtue of a vapor pressure differential between the base at 141 of housing 12 and the upper portion at 142 of such compartment 24, the higher pressure being at the 141 location. Similar considerations and pressure direction applies to the flow of dispersed and atomized water particles through diffusion material 22 within compartment 26, as represented by flow direction arrow 146.

Bernoulli's equation defining fluid flow states:

$$(p_1/w_1)+(v_1^2/2g)=(p_2/w_2)+(v_2^2/2g)=\text{a constant}$$

wherein $p_1/w_1$ and $p_2/w_2$ are discrete static pressure heads, as for example, at two different points 143 and 144 of air stream 32, g is the gravitational acceleration constant, $w_1$ is the specific weight of the atmospheric air at point 143, $w_2$ is the specific weight of the mixture of air, fuel vapor and water vapor at 144, $v_1$ is the velocity of air stream 32 at 143, $v_2$ is the velocity of air stream 32 at 144, and $v_1^2/2g$ and $v_2^2/2g$ are the discrete velocity pressure heads at points 143 and 144 respectively.

The reason for the upward dispersion and movement of the fuel from locations 141 to 142, and for similar upward movement and diffusion of the water in compartment 26, may be explained in terms of Bernoulli's equation considering the pressure and velocity terms thereof, since $w_1$, $w_2$ and g terms are constants.

Since the sum of the static and velocity pressure heads is a constant, an increase in velocity at any one point in air stream 32 will cause a decrease in the pressure at that point in order to obey Bernoulli's equation.

A decrease in area along the path of air stream 32, such as a decrease in area along a plane through point 144 with respect to the area along a plane through point 143, will cause an increase in velocity of such air stream 32 at point 143, since the cross-section area within conditioner 10 through which air stream 32 flows past point 143 is greater than the cross-section area of the flow past point 144. Therefore, any fluid velocity at 143 will be lower than the fluid velocity at 144, and the pressure at 143 will be higher than the pressure at 144.

The pressure at 141 is basically a static pressure and is approximately equal to the pressure at 143. Accordingly, the pressure at 141 will be greater than the pressure at 144, causing the fuel to be pulled upward within compartment 24 and dispersed and atomized by diffusion material 18 within compartment 24. Direction arrow 140 indicates the upward movement of atomized fuel combining with air stream 32 to be pulled into throat 65 by suction action of one of the engine's pistons during the intake stroke of the Otto cycle. The intake stroke completion is illustrated in cylinder 91 of engine 90.

Direction arrow 146 represents the upward movement of dispersed and atomized water particles through diffusion material 22 of compartment 26 and the combination of such atomized particles with air stream 32 to be pulled into throat 65 in similar manner as the fuel particles and air stream were pulled in.

Hence, a mixture of dispersed and atomized fuel and water vapors together with air is pulled into the throat 65 of intake manifold 60 past partially open throttle 66 as at 66' to be injected into cylinder 91 via intake manifold leg 61, as illustrated by suction action 69 when intake valve 96 is open during the intake stroke of the Otto cycle as the piston moves downward in cylinder 91. Such movement creates the pull or suction action upon the mixture of the atomized fuel and water particles mixed with air, to obtain efficient engine performance and reduced fuel consumption. The terms dispersed, diffused or atomized fuel and water or particles thereof indicates the vapor states of such fuel and water or particles thereof.

It should be noted at this time, that although heating chamber 50 and heat insulator member as at 40 have been included in the illustration, neither members 40 or chamber 50 is absolutely required to obtain a diffused and atomized fuel and water mixture inasmuch as conditioner 10 coupled to fuel and water supply means as at 100 will provide such mixture.

However, the addition of chamber 50 coupled to the exhaust manifold 70 will provide a free source of additional heat to raise the temperature of the fuel and water within conditioner 10, and also warm the air flowing therein. With such temperature increase, the fuel and water expand, and upon expansion raise their energy levels and the energy levels of their particles or vapors passing through their respective compartments 24 and 26 to mix with air stream 32 and then to be pulled through throat 65 to feed the engine. The greater the energy content of these fuel and water particles or vapors, the higher the engine operating efficiency, giving rise to reduced fuel consumption by the engine. Exhaust manifold 70 is equipped in this illustration with manifold legs 71, 72, 73 and 74.

When utilizing chamber 50, it may be necessary to interpose and affix heat insulating means 40 between the base of conditioner 10 and chamber 50 to prevent the fuel in compartment 24 and the water in compartment 26 from boiling off prematurely.

Water has a boiling point of 100 degrees centigrade, and hydrocarbon fuel such as gasoline a boiling point of about 150 degrees centigrade. Accordingly, different heat insulation will have to be provided for each of these components. A heat insulator such as a ceramic 42 may be provided with a recess therein to accommodate heat conductive material such as a copper disk 44. Consequently, a greater amount of heat insulation will be provided between chamber 50 and compartment 26 since water will tend to boil off and evaporate more rapidly than the liquid fuel. A lesser amount of heat insulation will result under compartment 24 than under compartment 26. The thickness of material 42 and the depth of recess therein to allow for implantation of a heat conductive disk should be such so that neither the fuel or the water reach their boiling points, yet both are at their maximum temperatures just below their respective boiling points.

Chamber 50 is constructed of heat conductive material 51, generally metallic, and is attached to conditioner 10 either directly or through heat insulation means 40 to obtain heat conduction from chamber 50 to conditioner 10. Chamber 50 has conduit couplers 54 and 55 at either end of the chamber. Conduit 53 is connected by means of coupler 54 to chamber 50 and conduit 56 is connected to such chamber by means of coupler 55. The other end of conduit 53 is coupled to exhaust manifold 70 at 75 by means of coupling connector 76. Conduit 77 is connected at one end thereof to one port of coupling connector 76 and the other end of conduit 77 is connected to one end of muffler 78, which is normal to an engine, with tailpipe 79 being connected to the other end of muffler 78. When utilizing chamber 50, it will be necessary to attach one end of another muffler 57 at the end of conduit 56, the other end of muffler 57 having a tailpipe 58 connected thereto so as to attenuate audible engine noise.

Hence, the flow of heat from exhaust manifold 70 through chamber 50 may be traced starting at cylinder 94 of engine 90 wherein the piston is shown in the cylinder completing its exhaust stroke, with exhaust valve 97 in open mode to permit the hot exhaust fumes 80 to be pushed out through manifold leg 74 and manifold portion 75 into coupler 76. The flow of hot exhaust fumes can take two paths 81 and 82. Path 81 allows for the passing of exhaust fumes through muffler 78 and tailpipe 79 into the atmosphere. Path 82 passes the exhaust fumes through conduit 53 into chamber 50 at 83, the exhaust fumes flow through the chamber and exit such chamber at 84 into conduit 56 at 85 to be passed through muffler 57 and tailpipe 58 into the atmosphere.

It should be appreciated that the only purpose of schematically illustrating four cylinders 91, 92, 93 and 94 of engine 90 as well as crankshaft 95 coupled to the piston rods of the pistons associated with such cylinders, was to show each piston at completion state of one of the strokes of the four stroke Otto cycle, so as to see how the intake strokes of the engine create pull upon the fuel, water and air components into the engine, and how the exhaust strokes of the engine effect heat transfer to chamber 50.

Cylinder 91 shows its piston at completion of the intake stroke and shows intake valve 96 in open mode to permit feeding such fuel, water and air into cylinder 91 as denoted by flow path arrow 69 when such fuel, water and air pass through throat 65 through partially open throttle 66 and through intake manifold port 61. Throttle 66 has a pivot type member 67 integral therewith, wherein pivot member 67 is coupled to a connecting member 166 by virtue of pivot member 67 extending through aperture 167 at one end of member 166. The other end of member 166 has a foot pedal 168 attached or coupled to member 166. Pedal 168 is pivoted at 169 for ease of opening or closing of throttle member 66 so as to control engine speed.

When throttle member 66 is in its closed state, obstructing most of the passageway in throat 65, only a small quantity of fuel, water and air mixture will pass by the periphery of throttle member 66. When throttle member 66 is open as at 66', then a greater quantity of the fuel, water and air mixture will be fed to the engine cylinders in proportion to the opening created in throat 65. The quantity of fuel, water and air intake feeding the engine cylinders during the intake stroke will therefore be proportional to the increased opening in throat 65 created by opening throttle member 66 by depressing foot pedal 168.

Crankshaft 95 will position the various pistons of this four cylinder engine so that only one of them at any one time is accomplishing one of the four strokes of the Otto cycle. In cylinder 91, the piston is positioned at completion of the intake stroke and the intake valve 96 is open. In cylinder 92 the piston is positioned at completion of the compression stroke and both the intake and exhaust valves are closed. In cylinder 93 the piston is at completion of the power stroke and both the intake and exhaust valves are closed. In cylinder 94 the piston is at completion of the exhaust stroke and the intake valve is closed but the exhaust valve 97 is open to eject the hot exhaust fumes from the cylinder chamber.

The fuel and water supply subsystem to feed conditioner 10, is generally shown at 100. Fuel tank 102 is a conventional tank common to an automobile. Tank 102 provides the fuel in its liquid state through conduit 104 to be pulled up by pump 108 and passed through conduit 110 into compartment 24 of conditioner 10. Pump 108 may be a conventional hydraulic or electric pump as used in automotive vehicles. An overflow return path for the liquid fuel is provided by means of conduit 112 extending into compartment 24 at a predetermined elevation therein, conduit 112 being connected to valve 114 which valve permits fuel flow downward in direction of the arrow on pump 114 into conduit 116. Conduit 116 is joined by a connector to fuel tank 102 so as to enable fuel which is in excess of a level above the height of conduit 112 within compartment 24 to be drained back into tank 102. Conduits 110 and 112 also pass through apertures in chamber 50, and when heat insulation means 40 is used, through apertures therein, so as to heat the fuel as it is injected by pumping action into compartment 24. Heating of the fuel by virtue of conduit 110 passing through chamber 50 and by virtue of chamber 50 being thermally coupled to conditioner 10 also preconditions the fuel to a heat level below its boiling point.

Water tank 120 is added to the automotive vehicle or engine system at any convenient location, for example within the trunk compartment or adjacent to the fuel tank if there is adequate space therefor. Tank 120 is connected by means of conduit 122 to pump 126. Pump 126 has an exit conduit 128 which passes through apertures in chamber 50, in insulation means 40 when provided and into compartment 26 of conditioner 10. Pump 126 may be similar to pump 108 in its structure and function. Conduit 128 extends into compartment 26 to a predetermined level so as to supply a water level within compartment 26 of required height in relation to the height of conduit 110 to maintain a desired and predetermined fuel to water volume ratio within conditioner 10. Conduit 134 is joined between a connector at tank 120 and overflow passage valve 132, and valve 132 has an exit conduit 130 which passes through apertures in heat chamber 50 and through an aperture in heat insulation means 42 when used, and into water compartment 26 of conditioner 10. Conduit 130 extends to a predetermined height within compartment 26 so as to drain water in excess of such predetermined level back into water tank 120 through valve 132 in direction of the arrow on valve 132 and through conduit 134. The heating of the water to a temperature below its boiling point obtains similar benefits as discussed in conjunction with the preheating of the fuel.

It should be noted that a conventional choke member, similar in structure to throttle member 66, has not been included within throat 65. Such choke member is optional and not actually needed with this system. Such choke member is generally actuated by a thermal coil element, which element expands to lengthen the coil element per se and thereby gradually open the choke to permit more air from air stream 32 to enter such throat, as the ambient engine temperature builds up with time. During initial starting of the engine, and after a quantity of fuel and water is injected by depressing accelerator pedal 168 once and permitting pedal 168 to return to its initial position, throttle member 66 is in a horizontal position blocking most of the air stream 32 from passing into the engine cylinders, and permitting only a portion of the fuel and water and air mixture to pass between the outer peripheral edges of throttle member 66 and the inner wall of throat 65 when such spacing between the periphery of member 66 and the wall of throat 65 is a minimum. Accordingly, the proper ratio of air, fuel and water vapor will pass through throat 65 into the intake manifold 60, and an additional choke component is not needed.

It should also be noted that although distribution of the fuel and water vapors in the presence of an air stream is shown as being made through a common throat 65 thereby providing a shorter travel path for mixture quantities through intake manifold legs 62 and 63 as compared with legs 61 and 64, the imbalance in travel paths is more than offset by the increase in engine efficiency and performance. Therefore, the system herein is a better substitute than an expensive and complex fuel injection system although the fuel injection system resolves these imbalances.

Of course, it is obvious from the foregoing, that modifications can be made to the engine structure so as to provide equal path lengths to the several cylinders by grouping the pistons radially, as is done in aircraft engines, and establishing the location of conditioner 10, chamber 50 and heat insulation means 40 if used, at a central point between the radial engine cylinders. Alternately, the shorter intake manifold legs can be lengthened to accomplish equal path lengths for the fuel, water and air mixture to flow to the various engine cylinders.

It should also be remembered that the intake manifold pull or air suction as illustrated at 69 in intake manifold leg 61 for cylinder 91, is exemplary of what occurs in each of the other cylinders during the intake stroke of the Otto cycle, and it is this intake, suction or vacuum action, as referred to in the automotive industry, which creates an air stream, such as 32, even when the automobile in which the engine is installed is not in motion. It should be appreciated that the intake manifold can be connected to other additional points of conditioner 10, if desired.

Figure 2:
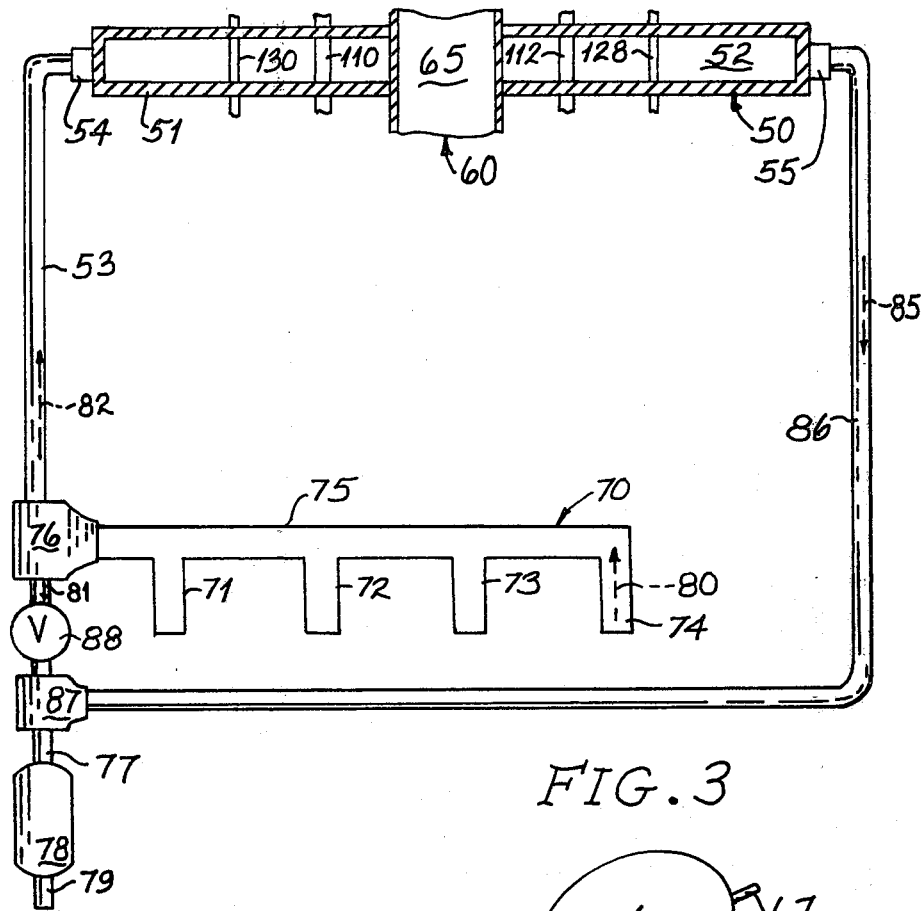
FIG. 2 is a view partially in cross-section and partially in elevation showing the heat chamber as used in FIG. 1 connected to the engine's exhaust system in a manner different from the heat chamber connection shown in FIG. 1.

Referring to FIG. 2, an alternate method of feeding exhaust manifold fluids through a chamber identical to chamber 50, enables the return of exhaust fluids 85 from chamber 50 to be passed to muffler 78 and exhausted into the atmosphere through tailpipe 79.

The components which are different from the FIG. 1 structure include conduit 86 coupled to connector 55 of chamber 50 wherein the other end of conduit 86 is connected by means of a conduit connector 87 to conduit 77. Conduit 77 is connected to muffler 78 and to connector 87 which feeds flow control valve 88.

Valve 88 is adjustable so as to limit the exhaust fluid flow rate therethrough. The exhaust fluid as at 80 will pass through portion 75 of exhaust manifold 70 and through connector 76. Some of the fluid will be passed through conduit 53 as at 82 into chamber 50 and the remainder of the exhaust fluid will pass as at 81 through valve 88, through connector 87, through conduit 77, through muffler 78 and out into the atmosphere through tailpipe 79. At the same time exhaust fluids exiting chamber 50 through conduit 86 as at 85, will be passed through connector 87, conduit 77, muffler 78 and out into the atmosphere through tailpipe 79. Valve 88 therefore tends to limit the heat flow from the exhaust manifold to chamber 50 by passing part of the exhaust fluids from the manifold through the muffler. This enables heat chamber 50 to be utilized in cooperation with conditioner 10 without the need of heat insulating means 40 as shown in FIG. 1. Valve 88 also restricts the heat from the exhaust fluids as at 85 exiting chamber 50 through conduit 86 from flowing back into chamber 50 so that the heat from the exhaust fluid at 85 is passed into the atmosphere through muffler 78 and tailpipe 79.

Figure 5:
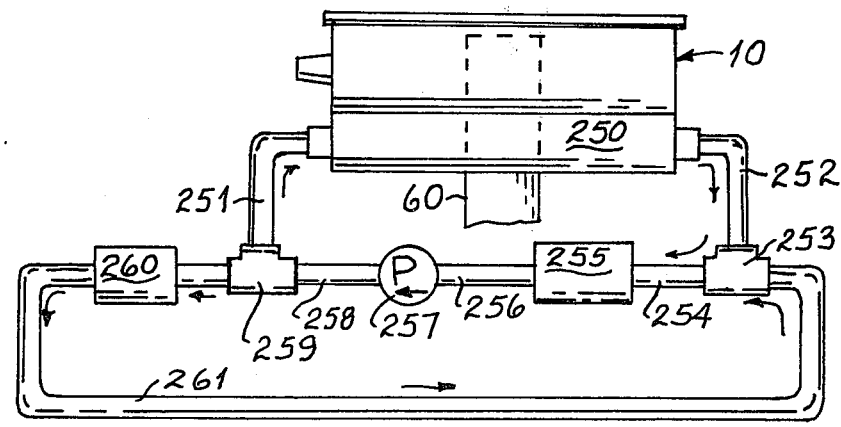
FIG. 5 is an elevation view of a system, alternate to the system of FIG. 1, wherein liquid coolant fluid of the engine is used to heat the conditioner and the fuel and water therein.

Referring to FIG. 5, a system utilizing a cooling liquid from cooling jacket 255 of the engine, which cooling liquid circulates through the engine's radiator 260, may be utilized to raise the fuel and water temperatures as obtained from tanks 102 and 120 respectively, in a similar manner as provided by use of chamber 50 of the FIG. 1 configuration.

Here, it will not be necessary to employ heat insulating means, such as means 40 of FIG. 1, between conditioner 10 and a fluid retaining chamber 250 because the coolant passing through jacket 255 and radiator 260 is generally maintained at a temperature of about 82 degrees centigrade. Such temperature is below the boiling points of the fuel and water used in conditioner 10, and hence the fuel and water in conditioner 10 will be raised to a temperature sufficient to increase the energy content of the fuel and water within conditioner 10 in similar but not identical manner as discussed in conjunction with FIG. 1 when chamber 50 was utilized.

Chamber 250, containing a portion of the engine's coolant is in intimate contact with the outer surface of conditioner 10 so as to pass heat from the coolant in chamber 250 to the fuel and water compartments of conditioner 10. The several conduits 110, 112, 128 and 130 are passed through chamber 250 in like manner as same were passed through the chamber in the FIG. 1 configuration, so as to feed the fuel and water compartments of conditioner 10 and also obtain preheating of conduits 110 and 128 and thereby add additional energy to the liquid fuel and water passing therethrough respectively.

All connections made to the engine's intake manifold is identical to that shown in FIG. 1 and need not be repeated herein. However, since the exhaust manifold heat of FIG. 1 is replaced herein by heat from the engine's liquid coolant, such coolant circulating system is described.

Accordingly, conduit 251 injects the coolant fluid at about 82 degrees centigrade temperature into chamber 250 in direction of the arrow adjacent conduit 251. Such fluid passes through chamber 250 and heat therefrom is conducted through the walls of chamber 250 and the base of conditioner 10 to heat the fuel and water therein, as already described. The fluid from chamber 250 flows out therefrom through conduit 252 in direction of the arrow adjacent conduit 252 into conduit connector 253. Such fluid passes out of connector 253 into conduit 254, coupling connector 253 and cooling jacket 255 of the engine. The cooling fluid passes out of jacket 255 into conduit 256 and through conduit 256 into pump 257. Pump 257 is a coolant pump normally used in an engine's cooling system which permits the coolant to be lifted and passed into the engine's radiator 260 through conduit 258, conduit connector 259 and conduit 261, conduit 261 being connected to radiator 260, thus enabling the recirculation of the coolant fluid back into conduit connector 253 in direction shown by the arrows adjacent conduit 261. At the same time as the coolant fluid passes out of connector 259 into radiator 260, connector 259 permits a portion of the coolant fluid to pass through conduit 251 into chamber 250.

Tapping off a portion of engine's liquid coolant for use as a temperature source to heat the fuel and water in conditioner 10, is a relatively simple matter. Such tapping off method can be adapted to most engines, except those using air cooling methods, in which case the system of FIG. 1 can be utilized.

It should be noted that although in FIG. 1 compartments 24 and 26, the fuel-diffusing material 18 and 22 respectively was specified as coarse steel wool, any other non-corrosive metallic fuel-diffusing material which permits fuel to be forced therethrough may be used. Non-metallic porous fuel dispersing or diffusing material such as spongy type substances or a porous plastic material that does not react with hydrocarbon fuels may also be used as substances 18 or 22.

I claim:

1. A method for conditioning energy-producing components fed to an engine which develops motive power, comprising in combination the steps of:
   (a) diffusing and vaporizing fuel from its liquid to its gaseous state within an air cleaner assembly;
   (b) diffusing and vaporizing water from its liquid to its gaseous state within said assembly, concurrently with step (a);
   (c) mixing the fuel and water in their gaseous states with air within said assembly; and
   (d) passing the gaseous mixture of fuel, water and air into said engine.

2. The method as stated in claim 1, including the additional step of:
   (e) heating the fuel and water in their liquid and gaseous states within said assembly, concurrently with steps (a) and (b).

3. The method as stated in claim 1, including the additional step of:
   (f) limiting the quantity of fuel and water in their liquid states residual within said assembly to predetermined levels, respectively.

4. The method as stated in claim 1, including the additional step of:
   (g) draining fuel and water in their liquid states from said assembly so as to maintain predetermined levels of said fuel and water respectively, within said assembly.

5. A fuel and water conditioning system for an engine utilizing fuel to develop motive power, said system comprising the combination of:
   an air cleaner assembly coupled to said engine, said assembly including:
      a first compartment retaining fuel diffusing means for vaporizing said fuel;
      a second compartment, adjoining said first compartment, retaining water diffusing means for vaporizing said water;
      an air filter retained within said assembly and spaced from said first and second compartments; and
      air passage means as an integral part of said assembly for enabling an air stream to flow within said system, said air stream combining with the vaporized fuel and vaporized water for injection thereof into said engine.

6. The invention as stated in claim 5, including heating means, thermally coupled to said assembly, for raising the temperature of said fuel and water.

7. The invention as stated in claim 5, including:
   a fuel supply source connected to the first compartment; and
   a water supply source connected to the second compartment.

8. The invention as stated in claim 5, wherein said engine has an intake manifold as an integral portion thereof, and including a throttle member located within said intake manifold, said throttle member controlling the quantity of vaporized fuel and water mixed with air injected into said engine.

9. The invention as stated in claim 6, wherein said engine has an exhaust manifold as an integral portion thereof, and wherein said heating means comprises a chamber connected to said exhaust manifold.

10. The invention as stated in claim 6, including heat insulating means, interposed between and in contact with said assembly and heating means, for decreasing the quantity of heat transferred from the heating means to said assembly.

11. The invention as stated in claim 7, including:
   fuel limiting means, connected to the first compartment, for draining fuel into the fuel supply source when the fuel in its liquid state within the water diffusing means exceeds a predetermined level; and
   water limiting means, connected to the second compartment, for draining water into the water supply source when the water in its liquid state within the water diffusing means exceeds a predetermined level.

12. The invention as stated in claim 9, including a muffler connected to said chamber.

13. The invention as stated in claim 9, wherein said engine has a muffler coupled to said exhaust manifold, and including a conduit coupling said chamber with said muffler.

14. The invention as stated in claim 10, wherein said heat insulating means comprises heat insulating material and a heat conductor embedded in said heat insulating material.

15. The invention as stated in claim 14, wherein said heat conductor is located adjacent to and in proximity of said first compartment.

* * * * *